US008879383B1

(12) United States Patent
Cirkovic et al.

(10) Patent No.: US 8,879,383 B1
(45) Date of Patent: Nov. 4, 2014

(54) METHODS AND APPARATUS FOR IMPROVING RELIABILITY OF POINT-OF-POINT NETWORK CONNECTION

(75) Inventors: Sasha Cirkovic, San Francisco, CA (US); Gowri Kuthanur, San Jose, CA (US); Pawan K. Singal, Sunnyvale, CA (US); Tejeswar Pichuka, Cupertino, CA (US)

(73) Assignee: Tellabs, Inc., Naperville, IL (US)

( * ) Notice: Subject to any disclaimer, the term of this patent is extended or adjusted under 35 U.S.C. 154(b) by 227 days.

(21) Appl. No.: 13/245,594

(22) Filed: Sep. 26, 2011

(51) Int. Cl.
*H04L 12/701* (2013.01)

(52) U.S. Cl.
CPC ..................................... *H04L 45/00* (2013.01)
USPC .......................................................... 370/219

(58) Field of Classification Search
CPC ...................................................... H04L 45/28
USPC .......................................................... 370/219
See application file for complete search history.

(56) References Cited

U.S. PATENT DOCUMENTS

2012/0176890 A1\* 7/2012 Balus et al. .................... 370/218
2013/0016606 A1\* 1/2013 Cirkovic et al. ............... 370/225

\* cited by examiner

*Primary Examiner* — Huy D Vu
*Assistant Examiner* — Bao G Nguyen
(74) *Attorney, Agent, or Firm* — James M. Wu; JW Law Group

(57) ABSTRACT

A network configuration having multiple network elements and routers using point-to-point network redundancy to improve network reliability and performance is disclosed. A process using point-to-point network redundancy is able to detect a first checking message ("CM") formatted in a connectivity verification protocol ("CVP") such as IEEE 802.1ag indicating a primary link failure. The primary link is a connection between a first network element ("NE") situated in a first network such as Ethernet based LAN network and a second NE situated in a second network such as an IP based MPLS network. Upon sending a second CM indicating the primary link failure to the second NE, a coordinated failover from the primary link to the backup link at both first and second NEs is performed.

20 Claims, 8 Drawing Sheets

METHODS AND APPARATUS FOR IMPROVING RELIABILITY OF POINT-OF-POINT NETWORK CONNECTION

FIELD

The exemplary embodiment(s) of the present invention relates to communications network. More specifically, the exemplary embodiment(s) of the present invention relates to improving network performance and reliability by employing a dual homing network configuration.

BACKGROUND

A high-speed network environment typically includes network devices such as access switches, routers, and bridges used to facilitate delivery of information packets and/or data traffic from source devices to destination devices. Information pertaining to the transfer of packet(s) through the network is usually embedded within the packet itself. Each packet traveling through one or more communications networks such as Internet, multiprotocol label switching ("MPLS") network, and/or Ethernet can typically be handled independently from other packets in a packet stream or traffic. For example, each node which may include routing, switching, and/or bridging engines processes incoming packets and determines where the packet(s) should be forwarded.

In a high-speed computing network environment, it is critical to maintain high speed traffic flows with minimal data loss and/or packet drop. As such, it is important to detect failures relating to data links, pseudo-wire emulation ("PWE"), and/or connections between the network devices, thereby allowing for traffic flows to be maintained and rerouted so as packet drop(s) is minimized. A problem associated with a high-speed computing network is data (or packet) loss due to data connection(s) or data link failure(s). Data loss can be caused by continuing sending the data packets to a router over a data link after the data link is already closed (or down). For example, standard Ethernet protection such as G.8031 does not protect end-to-end.

SUMMARY

A network configuration having multiple network elements and routers using point-to-point network redundancy is able to enhance and/or improve overall network performance. In one embodiment, a process using point-to-point network redundancy is able to detect a continuity check ("CC") message formatted in accordance with IEEE 802.1ag indicating a primary link failure. The primary link, for example, is a connection between a first network element ("NE") situated in Ethernet based LAN network and a second NE situated in an IP based MPLS network. Upon sending a second CC message to the second NE indicating the primary link failure, a coordinated failover from the primary link to the backup link at both the first and second NEs is performed.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
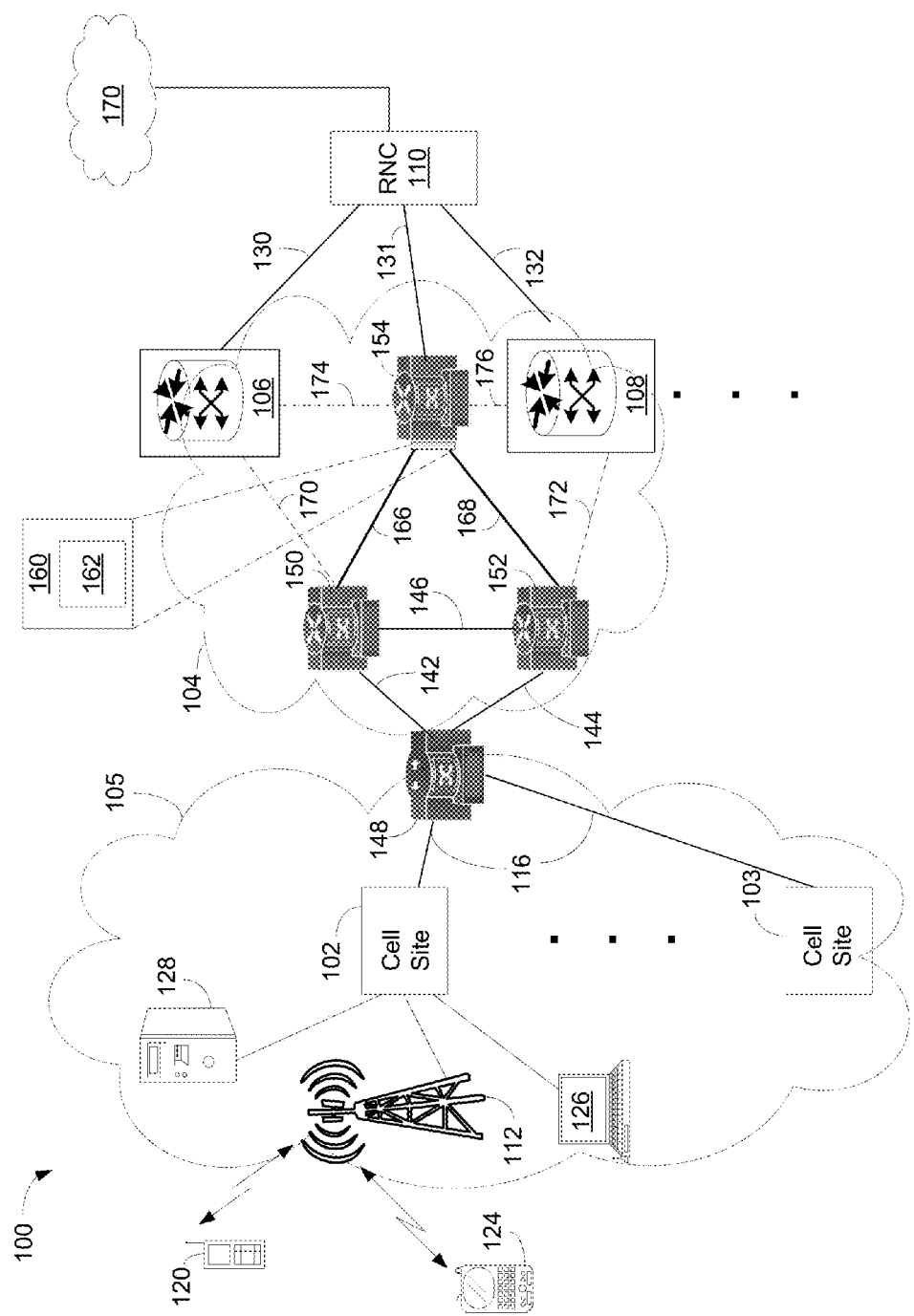
FIG. 1 is a block diagram illustrating a computer network organized in a dual homing configuration capable of using inter-working G.8031 MPLS PWE redundancy in accordance with one embodiment of the present invention.

Exemplary embodiment(s) of the present invention is described herein in the context of a method, device, and apparatus organized in a dual homing protection network using multiprotocol label switching ("MPLS") and pseudo-wire emulation ("PWE") redundancy interworking.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, for example, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, or a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Embodiments of the present invention illustrate a network configuration having multiple network elements and routers using point-to-point network redundancy to improve overall network reliability and performance. A process configured to implement a point-to-point network redundancy is able to detect a continuity check ("CC") message formatted in accordance with IEEE 802.1ag indicating a primary link failure between an access switch situated in an Ethernet based LAN network and a router situated in an IP based MPLS network. Upon sending a second CC message to the router indicating the primary link failure, a coordinated failover from the primary link to the backup link at both the first and second NEs is performed. In one aspect, the protection switching mechanism is operated in accordance with G.8031 under International Telecommunication Union ("ITU") standard ("G.8031").

FIG. 1 is a block diagram 100 illustrating a computer network organized in a dual homing configuration capable of inter-working G.8031 MPLS PWE redundancy in accordance with one embodiment of the present invention. Diagram 100 includes multiple cell sites 102-103, switching networks 104-105, multiple routers, and a Radio Network Controller ("RNC") 110. RNC 110 is further coupled with a Wide Area Network ("WAN") and/or Internet 170. Depending on the applications, RNC 110 may be coupled with other RNC or RNCs to enhance network management and capacities. In an alternative configuration, RNC 110 may be replaced with other network element(s) such as gateway(s) and router(s). It should be noted that the underlying concept of the exemplary embodiment(s) of the present invention would not change if one or more blocks (or elements) were added to or removed from diagram 100.

Switching network 104 includes an access switch ("AS") 148, a primary router 150, a backup router 152, and a destination router 154, wherein AS 148 and routers 150-154 are configured to form a dual homed or dual homing redundancy network configuration. AS 148, in an alternative embodiment, is located at the edge or outside of switching network 104, and is coupled to one or more cell sites 102-103 via connections 116. Switching network 104 may include additional network elements ("NEs") and/or network management system ("NMS") depending on the applications. Routers 106-108, in one embodiment, can be edge routers and/or routers inside of switching network 104. Switching network 104, in one example, can be an IP and/or Multi Protocol Label Switching ("MPLS") based circuit network which may operate at a layer of Open Systems Interconnection Basic Reference Model ("OSI model"). Network 104 may further include a circuit switch block and/or a backhaul block for transferring information and/or various data traffic to and from network clients.

To simply forgoing discussion, Ethernet based network is designated to switching network 105, and MPLS based network is used for switching network 104. Note that MPLS is able to facilitate, label, and/or encapsulate multiple network protocols to transport data between network nodes using virtual links. For example, packets are routed based on their labels, which allows establishing point-to-point circuits across different transport medium with different protocols.

Switching network 104, in one embodiment, includes virtual a network such as virtual local area network ("VLAN") such as connections 142-144. VPLS provides Ethernet based multipoint to multipoint communication over the IP/MPLS network. VPLS is also able to use pseudo-wires ("PW") to connect multiple geographically separated hosts and/or nodes and allows the dispersed nodes to share the same or similar Ethernet broadcast domain. VLAN, on the other hand, is a logical LAN or multiple LANs grouping multiple hosts allowing hosts to communicate using the same broadcast domain. A VLAN uses the similar requirements and/or attributes as a physical LAN and links multiple hosts or devices together even if they are not located on the same network switch. It should be noted that various protocols, such as interior border gateway protocol ("iBGP"), MPLS, OSPF, and RSVP (resource reservation protocol), may be used as Layer 2 (L2) VPN (virtual private network) related applications.

AS 148, in one embodiment, is a managed edge system and/or management system capable of managing a network, connections, ports, or switching services. For example, AS 148 allows service providers to access networks at traffic aggregation points or cell sites. An advantage of employing AS 148 is that it provides a scalable network solution between customer equipment ("CE") and provider edge ("PE") routers for data transfer. AS 148, in one example, is capable of performing both access switching functions and routing functions.

A router, for example, is an NE or network device capable of forwarding data packets across one or more communication networks in accordance with its routing mechanism such as a routing table. A router may be a microprocessor-controlled computing system which may be coupled to two or more data lines configured to direct data traffic through one or more communication networks. NE or network client, in one example, can include one or more routers, hubs, switches, hosts, base stations, and the like. A NMS, in one aspect, is a computer system or server including hardware and/or software used to monitor and control the network including various NEs. Diagram 100, for example, includes routers 106-108 and 150-154 which are capable of routing information between cell sites 102-103 and RNC 110 via switching network 104.

A dual homed redundancy host, network or gateway is, for example, situated between two interfaces to enhance data integrity or prevent data drop. Dual homed redundancy, also known as dual homing, provides two independent data paths for each dual attached device. AS 148, in one embodiment, is structured in a dual homed redundancy configuration wherein a primary path 142 is used to connect AS 148 to primary router 150 and a secondary path 144 is used to connect AS 148 to a backup router 152. An active PWE 166 is used to connect primary router 150 to a destination router 154 and a non-active PWE 168 is used to connect backup router 152 to destination router 154. Note that primary path 142 and active PWE 166 are considered the primary link, while secondary path 144 and non-active PWE 168 are considered the backup link.

To implement dual homing redundancy, Ethernet protection switching standard G.8031 under ITU (International Telecommunication Union) may be used to establish a dual homing redundancy topology having a primary link and a secondary link for every VLAN. Failover, in one aspect, refers to a network element automatically, without human intervention, switch over to a backup path or circuit after detecting a failure of the primary path. In one embodiment, G.8031 messaging mechanism is provisioned into various MPLS equipments situated in MPLS network whereby a coordinated failover between point-to-point NEs can be performed. For example, a coordinated failover between AS 148 and router 154 can be performed if both AS 148 and router 154 can process G.8031 messages.

Under normal conditions, AS 148 transmits data packets to and from destination router 154 through the primary link via primary router 150. In the event that path 142 or primary router 150 fails, AS 148 switches its connection from primary router 150 to backup router 152 whereby AS 148 can continue network services via a backup route. When primary router 150 recovers from an earlier crash or failure, it, in one embodiment, instructs AS 148 to switch back (or revert) from backup router 152 to primary router 150 using interwork between Ethernet protection and MPLS PWE redundancy via G.8031 bundle 160 and G.8031 ports 162.

Primary and backup routers 150-152, for example, may also be interconnected by Interior Gateway Protocol ("IGP") 146 for redundancy purposes. Similarly, routers 106-108, and 154 may also be interconnected by IGP 174. Each router, for example, includes functions of IP routing. Connections 130-132 are used to couple RNC 110 with routers 106-108, and 154 wherein connections 130-132 can be land line connections, wireless connections, or a combination of wired and wireless connections.

Cell site 102, also known as a base station, includes a radio tower 112, a computer 126, and a server 128, wherein radio tower 112 further includes a cellular phone 120 and a handheld device 124 connected via wireless communications. Base station or cell site 102 is capable of communicating with mobile devices such as cellular phone 120 and handheld device 124 via radio tower 112. It should be noted that cell site 102 may include additional radio towers as well as other land switching circuitry, not shown in FIG. 1. The cell stations such as cell sites 102-103 can be configured to support wireless communications as well as wired communications. Each cell site such as cell site 102 can be considered as a host and is capable of maintaining a connectivity session such as a bidirectional forwarding detection ("BFD") session with a destination router so as to continuously verify the connectivity between the host and the router.

Upon detecting a loss of CC message in accordance with IEEE 802.1ag, AS 148, in one embodiment, commences an operation of failover. Upon setting remote defect indication ("RDI") to one (1), hereinafter referred to as RDI=1, AS 148 sends a CC message with RDI=1 to primary router 150 via primary path 142. After receiving CC message with RDI=1, primary router 150 relays CC message with RDI=1 to a G.8031 port located at router 154 via an active circuit bundle member PW 166. Upon receipt of the CC message with RDI=1, router 154, which is also known as destination router or destination NE, is able to make a coordinated failover with AS 148 in response to the CC message.

For operation relating to reversion, after activating backup router 152 for routing services, primary router 150 begins a recovery process to restore (or resume) itself from inactive status to active status. Once primary router 150 is restored and is able to resume network service, primary router 150 reestablishes label-switched path ("LSP") using RSVP via connection 142 between router 150 and AS 148. When AS 148 detects 802.1ag CC from router 150, AS 148 sends a 802.1ag CC message with reset of RDI (RDI=0) to primary router 150. After receiving CC message with RDI=1, primary router 150 resents the CC message with RDI=0 to a G.8031 port located at router 154 via an active circuit bundle member PW 166. Upon commencement of a revert-timer, AS 148 notifies router 154 that the revert-timer is ticking (or counting) and that the backup link will continue to be used until the revert-timer expires. When the revert-timer expires, AS 148 and router 154 are able to make a coordinated reversion.

An advantage of providing a redundant dual homing networking solution is to enable G.8031 capable equipment to interwork with MPLS capable network equipments to enhance network reliability. To implement dual homing G.8031 protection using VPLS, PWE devices or ports at MPLS environment are overlaid or provisioned with G.8031 protection mechanism. When network nodes linked by a point-to-point connection across multiple networks are overlaid or programmed with G.8031 protection mechanism, a coordinated failover or recovery process can be implemented upon detection of nodal failures.

Figure 2:
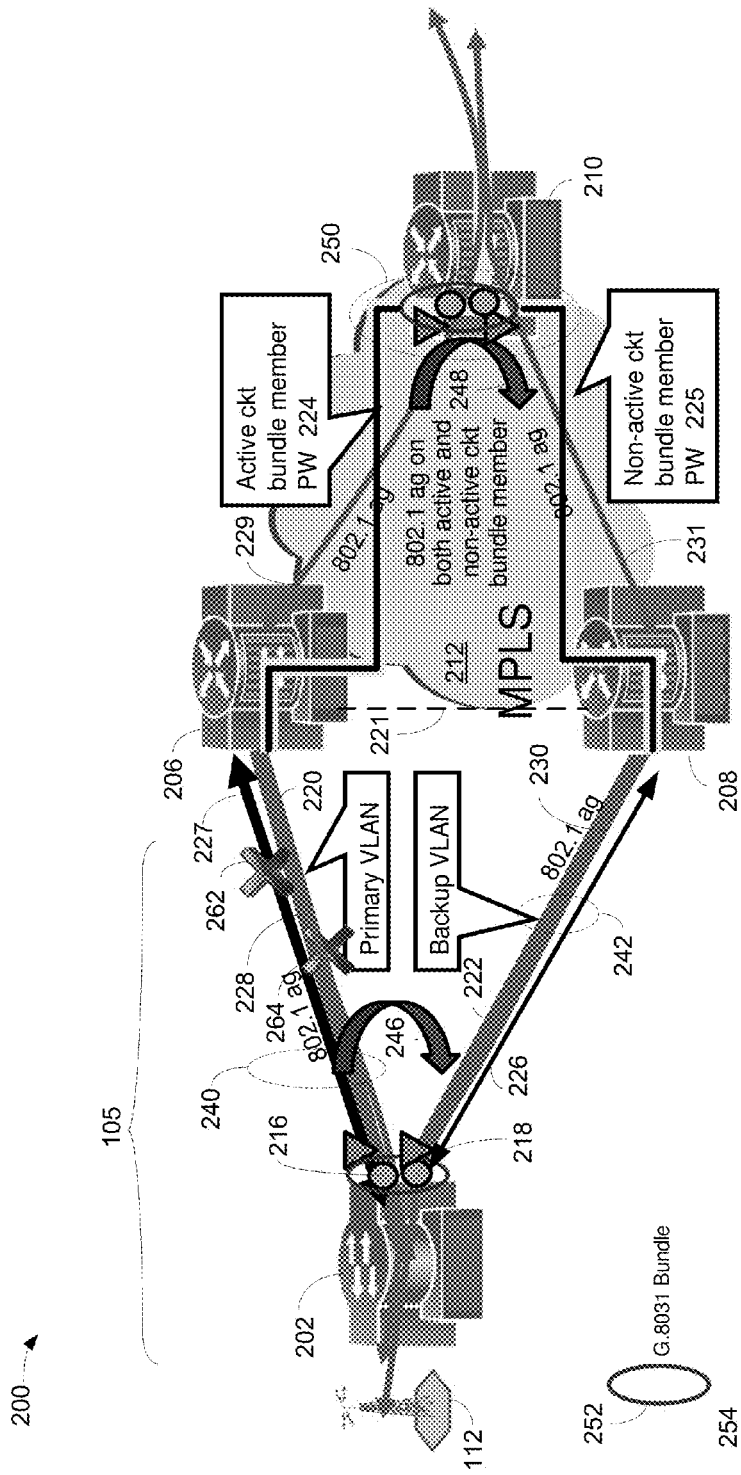
FIG. 2 is a block diagram illustrating an exemplary computer network layout capable of coordinated failing over to a backup link using G.8031 MPLS PWE redundancy interwork in accordance with one embodiment of the present invention.

FIG. 2 is a block diagram 200 illustrating an exemplary computer network layout capable of coordinated failing over to a backup link using G.8031 MPLS PWE redundancy interwork in accordance with one embodiment of the present invention. Diagram 200 includes a NE 202, routers 206-210, and links 220-225 wherein links 220-222 are used to connect NE202 and routers 206-208 and links 224-225 are used to link NE 210 with router 206-208. NE 202 is further configured to communicate with other network device, such as a cell site, base station, or radio tower 112. NE 202, for example, may be a node, AS, router, hub, or a combination of routers, hubs, AS, and/or switches. NE 202 is, in one embodiment, an AS, and hereinafter referring NE 202 to AS 202 to simply forgoing discussion. It should be noted that the underlying concept of the exemplary embodiment(s) of the present invention would not change if one or more blocks (or devices) were added to or removed from diagram 200.

To improve data integrity as well as network reliability, network layout shown in diagram 200 illustrates a dual homed redundancy network, also known as dual VLAN topology. In one embodiment, the dual homed or dual homing network configuration includes an AS 202, primary router 206, backup router 208, and destination router 210 wherein AS 202 is coupled to a first end of a primary link 220 and primary router 206 is coupled to a second end of primary link 220. A point-to-point (or end-to-end) connection between AS 202 and router 210 is implemented by employing primary link 220, primary router 206, and active PWE link 224.

Active PWE link 224, in one embodiment, is an active circuit bundle member PW configured to couple with a G.8031 port managed by G.8031 bundle 250 at router 210. During provision phase, router 210, in one example, is provisioned to overlay G.8031 protection over router 210 as G.8031 bundle 250. Bundle 250 or 252, in one embodiment, includes a G.8031 port 254 and Down MEP (Maintenance End Point) and is a logical grouping of multiple device interfaces using wide area network techniques to emulate physical interfaces. Accordingly, router 210 (or destination router), which is situated in the MPLS environment, uses G.8031 bundle to process G.8031 messages and/or CC messages sent from AS 202 which is situated in the Ethernet environment.

AS 202, in one example, continuously monitors and verifies connectivity between AS 202 and AS 210 traversing through primary router 206 using the DOWN MEP at G.8031 bundle 216 for active PWE bundle member 250. The connectivity verification protocol, for example, may use CC messages under IEEE 802.1ag standard, which hereinafter can also be referred to as 802.1ag CC message.

The linear protection switching protocol, in one example, is G.8031 providing working and protected paths operable in accordance with ITU standard, hereinafter can be referred to as G.8031 message. Backup router 208 is coupled to AS 202 via a backup link 222 and is operable to provide a dual homed network redundancy between AS 202 and primary router 206 via the linear protection switching protocol. In one example, primary link 220 can be a primary VLAN and backup link 222 can be a backup VLAN.

Under normal conditions, AS 202 transmits data packets to and from primary router 206 via primary path 220 to reach router 210. In the event that path 220 or primary router 206 fails, AS 202 switches its (logic) connection from primary router 206 to backup router 208 in coordination with router 210 whereby AS 202 is able to continue providing network services/routing to router 210 via a backup route. When primary router 206 recovers or restores from an earlier crash or failure, primary router 206, in one embodiment, informs AS 202 that it is ready to receive and route data again. To switch back (or revert) from backup router 208 to primary router 206, AS 202 begins a reversion process including activating a revert-timer and closing the backup router's port(s). In an alternative embodiment, reversion is not implemented and the backup link continues its network routing until it breaks down.

AS 202, in one embodiment, includes a G.8031 bundle 218, wherein bundle 218 further includes multiple G.8031 ports connected to multiple links for providing link protection or redundancy. 802.1ag message 226 checks connectivity of links 220 and 229, and 802.1ag message 227 checks connectivity of links 222 and 231. The CC message traverses from DOWN MEP at G.8031 port 216 to DOWN MEP at G.8031 bundle 250, and from DOWN MEP at G.8031 port 218 to DOWN MEP at G.8031 bundle 248. Links 220-222 are configured to facilitate transferring information including 802.1ag message and G.8031 message. Alternatively, links 220-222 may include multiple sub-links wherein some sub-links are dedicated to handle 802.1ag CC message while other sub-links are dedicated to handle G.8031 messages.

Nodes 202-210, in one embodiment, are configured to employ connectivity fault management ("CFM") in accordance with IEEE 802.1ag. IEEE 802.1ag Ethernet CFM Protocol includes continuity check, CC messages, link trace and loopback protocols for assisting network operators to maintain/manage the network. IEEE 802.1ag defines a construct called MEP, which is capable of sending periodic CC messages PDUs (protocol data units) and is capable of receiving CC message PDUs. The MEP at each node, which is also referred to as Down MEP, sends a CC message over a port of a node through a link to periodically verify the connectivity between the two nodes. Since Down MEP is able to send a message in a direction to a port, it is well suited to employ as a protocol entity to detect node connectivity at the link level. It should be noted that both Up MEP & down MEP are capable of receiving the CC messages alike. Upon enabling of Down MEPs at nodes 202-210 CC messages are periodically sent, monitored, and received for connectivity verification.

During normal conditions, data streams or data packets travel from radio tower 112 to router 210 via primary links 220 and 224 passing through AS 202 and primary router 206. In one embodiment, router 208 can be provisioned as a primary router and router 206 may be provisioned as a backup router. Alternatively, a backup router may be dedicated to backup more than one primary router. Upon detecting a failure, a failover or a coordinated failover as indicated by arrow 246 will occur to switch from a working path 240 to a protected path 242. Primary and backup routers 206-208, for example, are also interconnected by IGP 223 to facilitate redundancy. A coordinated failover is that AS 202 and router 210 switch from working path 240 to protected path 242 approximately same time using G.8031 messaging system and/or 802.1ag CC messages.

An advantage of employing an embodiment(s) of the dual homed network using G.8031 bundle to provide end to end service protection for mixed L2 Ethernet and MPLS network is that coordinated switchover between primary and backup routers with sufficient speed that does not affect normal network services whereby packet loss or black-holing scenario is minimized or reduced.

AS 202 includes input/output ("I/O") ports which are used to transmit and receive information between nodes 202-208 via connections or links 220-222. Links 220-222, for example, may be an Ethernet cable, USB (Universal Serial Bus) cable, phone lines, twisted pair cables, optical cables, and/or a combination of the above-mentioned connections. In one embodiment, links or connections 220-222 are configured to support one or more of network services. Some exemplary applications, such as VLAN, IPTV, VoD, video conferencing, real time data, stock transactions, can employ the dual homed network topology to enhance communication performance.

During an operation, when AS 202 detects a loss of CC message 252 over link 220, AS 202 sets RDI to one (1) (RDI=1) and sends a CC message with RDI=1 to router 210 via primary router 206 and active circuit bundle member PW 224 indicating that link 220 is down as indicated by numerals 262-264. After receipt of the CC message with RDI status (RDI=1), router 210 shuts down active circuit member PW 224 down and fails over to non-active circuit bundle member PW 225 in accordance with the CC message 252. AS 202 fails over to G.8031 protected path or link 222 which could occur substantially the same time as switchover occurs at router 210. AS 202 sends a G.8031 message to router 210 via backup router 208 instructing router 210 to close port (Tx=0). After receipt of G.8031 message regarding close port, router 210 checks the status and sends a G.8031 message to AS 202 via backup link 222 to acknowledge the failover. Upon receipt of acknowledge message, AS 202 begins to transmit data packets to and from router 210 via data paths 226 and 231.

An advantage of using a dual homed network configuration using G.8031 Virtual Connection protection with a coordinated failover is to seamlessly switchover to a backup router without losing a large amount of packets.

Figure 3:
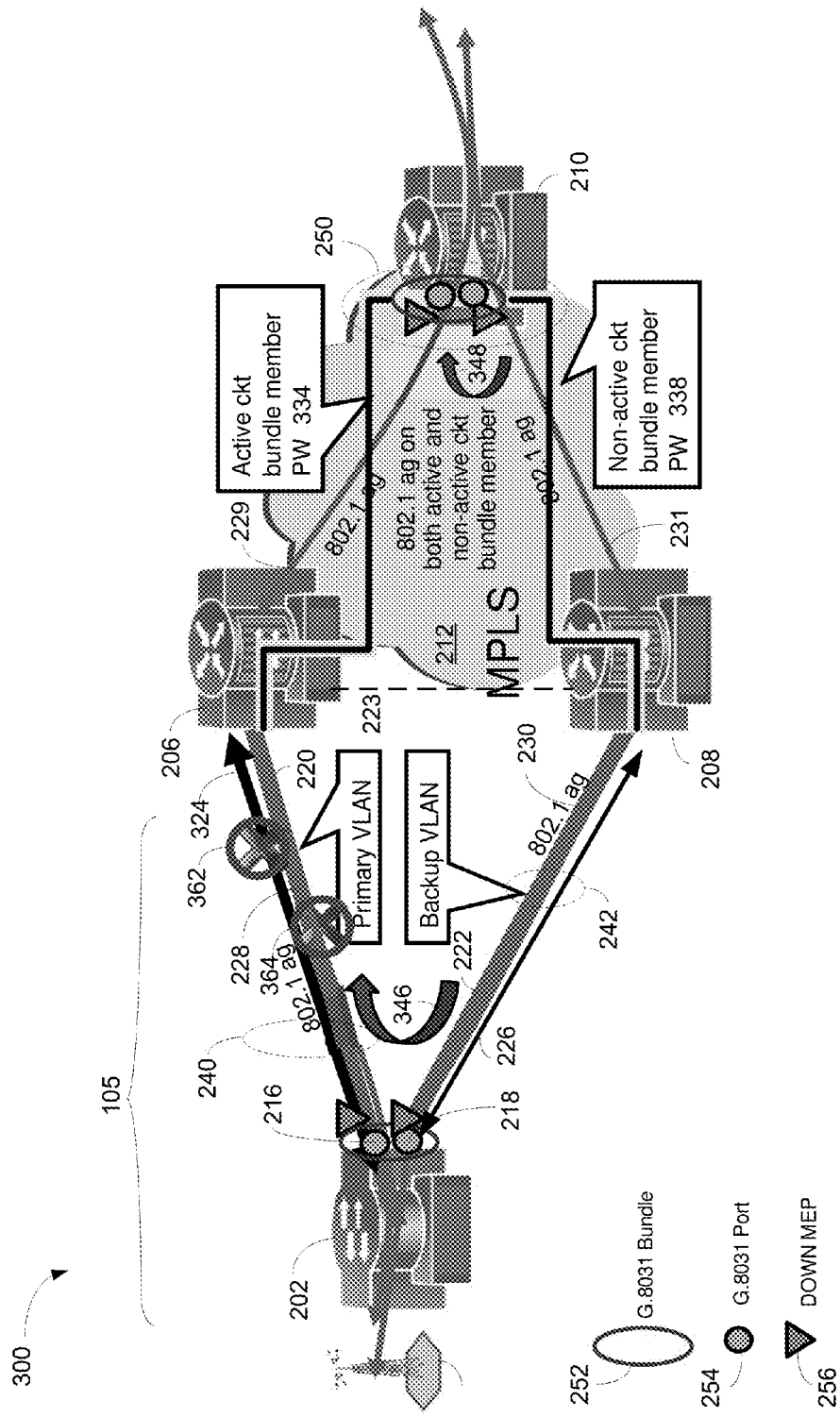
FIG. 3 is a block diagram illustrating an exemplary computer network layout capable of coordinated reverting back to a primary link using G.8031 MPLS PWE redundancy interwork in accordance with one embodiment of the present invention.

FIG. 3 is a block diagram 300 illustrating an exemplary computer network layout capable of coordinated reverting back to a primary link using G.8031 MPLS PWE redundancy interwork in accordance with one embodiment of the present invention. Diagram 300, which is similar to diagram 200, includes an AS 202, routers 206-210, and links 220-222 wherein links 220-222 are used to connect AS 202 and routers 206-208 in such a way that a dual homed network configuration is formed. It should be noted that the underlying concept of the exemplary embodiment(s) of the present invention would not change if one or more blocks (or devices) were added to or removed from diagram 300.

The dual homed network shown in diagram 300 is in a reversion operation wherein backup router 208 is responsible to route the traffic between AS 202 and router 210 via data paths 242 and 338 while primary router 206 is in a process of recovery from an earlier failure. Once primary router 206 is recovered or restored as indicated by numeral 362-364 and is able to resume network service, primary router 206 reestablishes communication over link 220 between router 206 and AS 202. When AS 202 detects 802.1ag CC message 324 from primary router 206, AS 202 sends a 802.1ag CC message 224 providing resetting value of RDI (RDI=0) to router 210 via primary router 206. Router 210 clears RDI condition(s) after it receives RDI=0 from AS 202. While the revert-timer is started, AS 202 notifies router 210 that the revert-timer has been commenced and backup link 222 will continue to serve or transfer data between AS 202 and router 210 until the revert-timer expires.

When the revert-timer expires, AS 202 switches back to G.8031 working path or primary link 220 and sends a G.8031 message 230 instructing router 210 to close its port or reset its port to zero (Tx=0). Router 210 closes its port or sets its port to zero (Tx=0) and circuit bundle switchover logic at router 210 begins a reversion process in response to message 230. Router 210 sends an acknowledgement message to AS 202 after the reversion is completed. Upon receipt of the acknowledgement message, AS 202 begins to facilitate packet transfer or data transfer between AS 202 and router 210 via data paths 334 and 240.

In one example, 802.1ag defects can be detected and monitored by circuit bundle PWE MEP. In a circuit bundle PWE MEP network environment, embodiment(s) of dual homed network using G.8031 protected service and 802.1ag messages employs features listed in Table 1 for coordinated switching over between the primary and backup nodes.

TABLE 1

802.1ag session time out triggers LDP Label WITHDRAWAL MESSAGE
802.1ag RDI triggers LDP Label WITHDRAWAL MESSAGE
G.8031 Close port message trigger LDP Label WITHDRAWAL MESSAGE
G.8031 Open Port Triggers LDP Label WITHDRAWAL MESSAGE It should be noted that label distribution protocol ("LDP") as indicated in Table 1 is a label protocol employed in MPLS environment. LDP defines and facilitates meaning of labels between two connected routers, switches, or network elements. For instance, two (2) label switching routers ("LSR") forward packets between them based defined meaning of the labels via LDP.

Figure 4A:
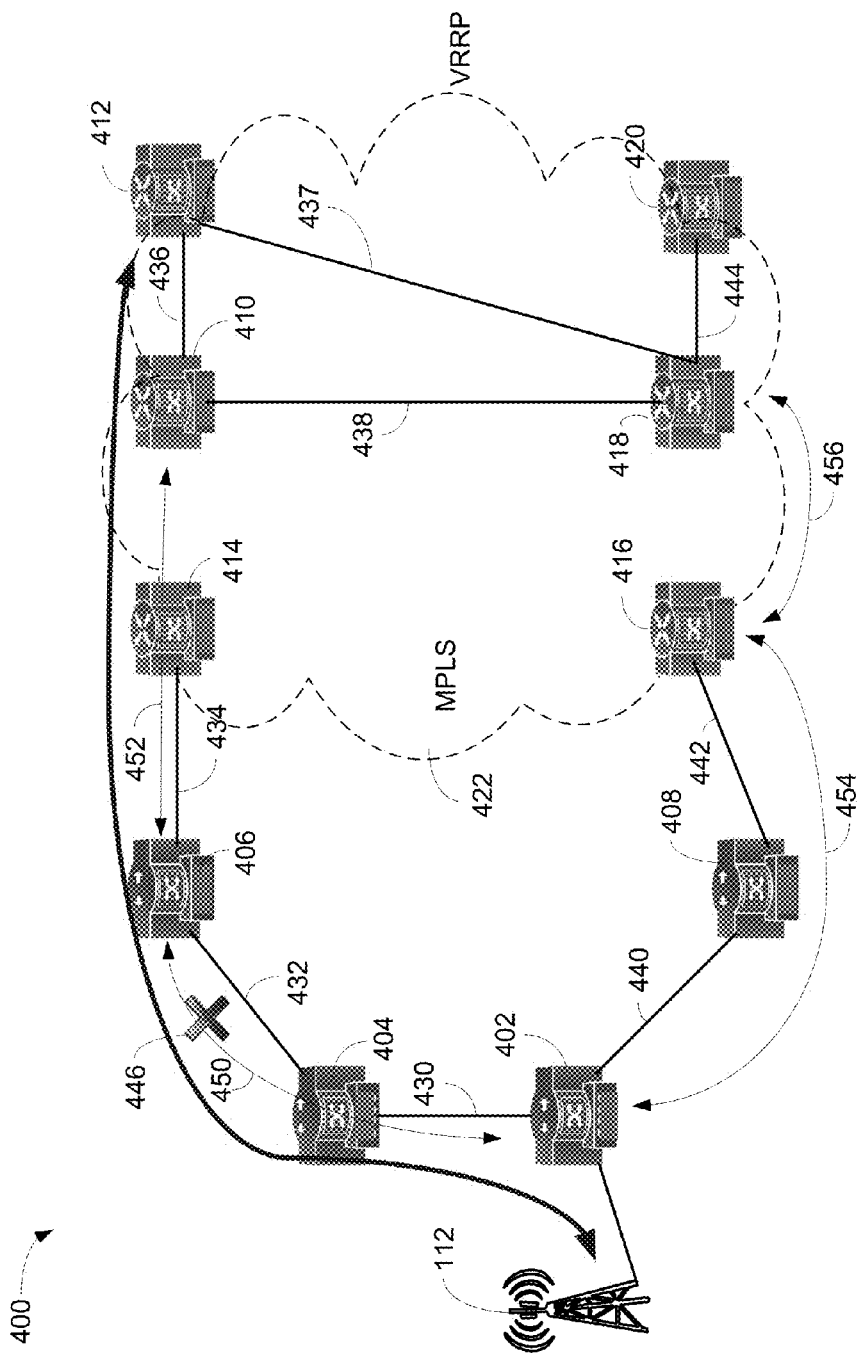
FIG. 4AB are block diagrams illustrating an exemplary computer network having multiple switches and router capable of coordinated failing over to backup router(s) upon detecting a link failure in accordance with one embodiment of the present invention.
Figure 4B:
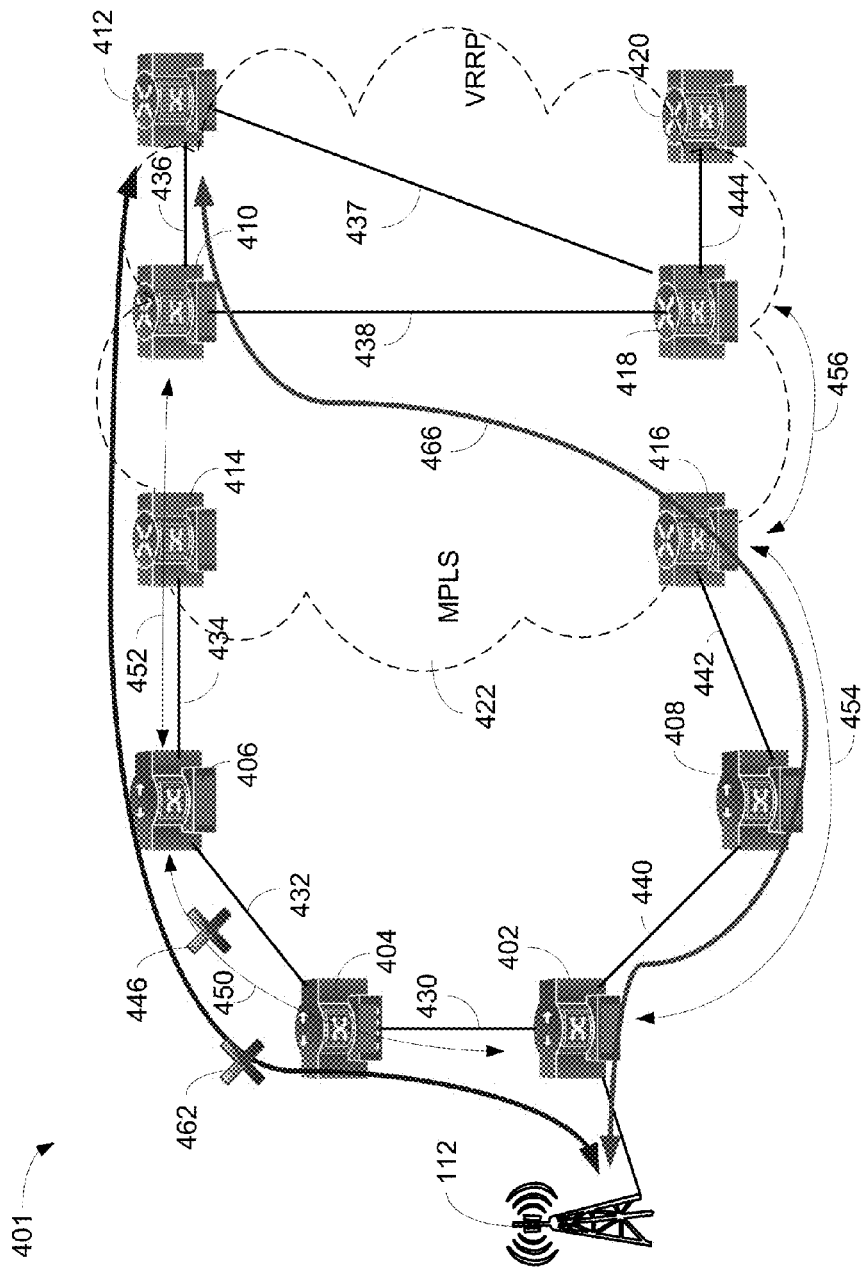

FIG. 4AB are block diagrams 400-401 illustrating an exemplary computer network having multiple switches and router capable of coordinated failing over to backup router(s) upon detecting a link failure in accordance with one embodiment of the present invention. Diagrams 400-401 include ten (10) nodes 402-420 and links 430-444 wherein links 430-444 are used to connect nodes 402-420. In one embodiment, nodes 402-408 are access switches and nodes 412-420 are routers. AS 402 is able to communicate with one or more other network devices, such as a cell site, base station, or radio tower 112. It should be noted that the underlying concept of the exemplary embodiment(s) of the present invention would not change if one or more blocks (or devices) were added to or removed from diagrams 400-401.

The computer network shown in diagrams 400-401 illustrates a dual homed network layout with G.8031 protection overlaid PWE and MPLS capable equipments. AS 402 connects to a primary router 414 through links 430-434 having data paths 450-452 and connects to a backup router 416 through links 440-442 having data paths 454-456. In an alternative embodiment, AS 404 is backed up by backup router 416 via links 430 and 440-442 through AS 402. It should be noted that a backup router such as router 418 may be used to backup more than one primary or master router. Routers 410 and 414-418, in one aspect, are coupled via MPLS 422 using PWE 436-437. In one embodiment, router 412 and 420 may be VRRP routers.

During an operation, data packets travel from radio tower 112 to router 412 routed by primary router via data path 446. Router 412 operating under MPLS environment is configured with G.8031 protection. When AS 402 detects an 802.1ag failure 446 such as a loss of CC message, AS 402 sends a G.8031 message to router 412 via primary router 414 indicating that primary VLAN which includes links 430-434 is down as indicated by numeral 462. Upon receipt of VLAN down or offline notification, AS 402 fails over to backup router 416 via protected paths or links 440-442 for continuing routing the traffic from radio tower 112 to router 412 via newly established data path 466 via links 440-442 and 437 or 438. A reversion process takes place when the 802.1ag failure 446 recovers.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
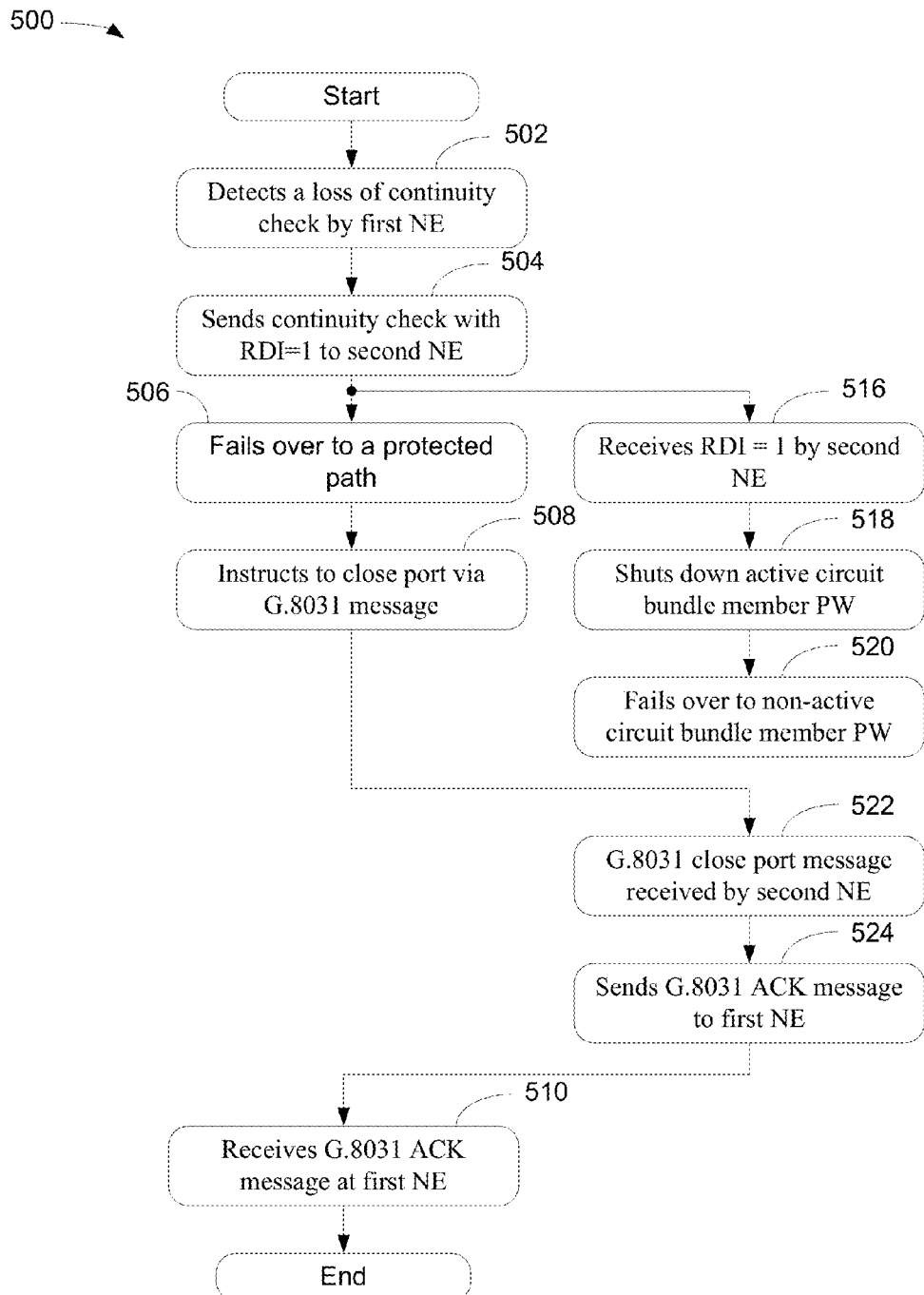
FIG. 5 is a flowchart illustrating an exemplary process of coordinated point-to-point switchover in a dual homed network configuration in accordance with one embodiment of the present invention.

FIG. 5 is a flowchart 500 illustrating an exemplary process of coordinated point-to-point switchover in a dual homed network configuration in accordance with one embodiment of the present invention. At block 502, a process detects a loss of 802.1ag CC message over a primary VLAN. A CC message with RDI=1 is sent to a destination router from AS via a primary router indicating primary VLAN down at block 504. At block 506, an AS affected by the primary VLAN down fails over to a protected path using G.8031 message and at block 508, AS sends G.8031 message to destination router to close its port.

Upon receipt of RDI=1 at block 516, destination router at block 518 shuts down active circuit bundle member PW which is a primary PWE. The destination router at block 520 fails over to non-active circuit bundle member PW which is a backup PWE to continue receiving data. After receipt of G.8031 close port message, destination router at block 522 verifies its connecting status. At block 524, destination router sends G.8031 acknowledgement message to AS indicating its status. At block 510, upon receipt of G.8031 acknowledgement message, the access switch begins to route traffic through the backup path, also known as protected path.

Figure 6:
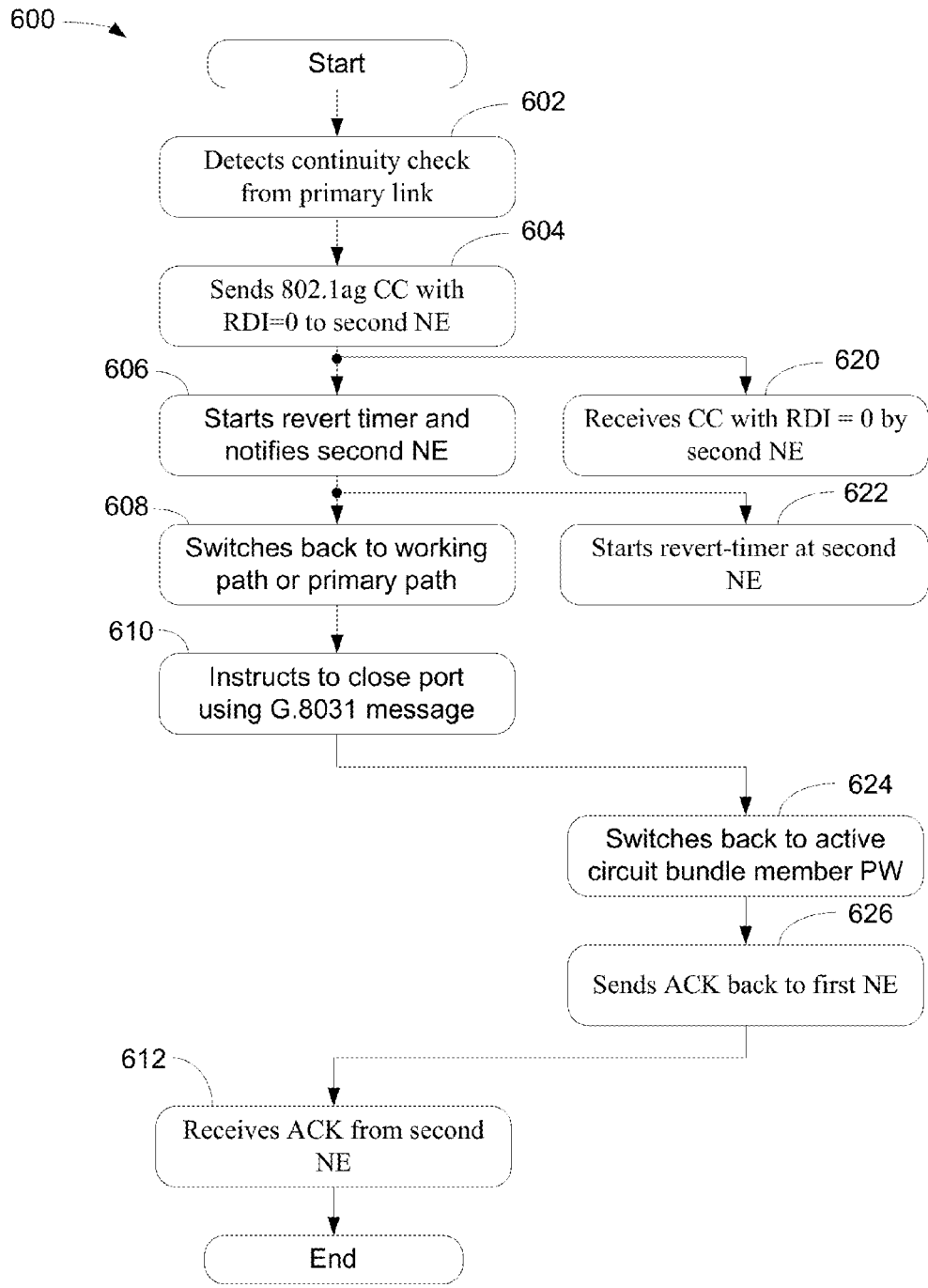
FIG. 6 is a flowchart illustrating an exemplary process of coordinated reversion to the primary path in accordance with one embodiment of the present invention.

FIG. 6 is a flowchart 600 illustrating an exemplary process of coordinated reversion to the primary path in accordance with one embodiment of the present invention. At block 602, the process of a dual homed network layout using G.8031 protection overlaying PWE detects a CC message from the primary router. The AS, at block 604, sends an 802.1ag CC message with RDI=0 to the end router via the primary router. Upon receipt of RDI=0 sent from the AS, the end router clears RDI condition(s) at block 620. At block 606, the AS starts revert-timer and notifies the end router to starts its own revert-timer at block 622 while the backup link will continue to route the traffic until the revert-timer expires.

When the revert-timer expires, the AS, at block 608, AS reverts from the backup link to the primary link. The AS, at block 610, sends a G.8031 message to instruct the end router to close its port or set its port to zero (Tx=0). Upon receipt of the G.8031 message, the end router switches from non-active circuit bundle member PW to active circuit bundle member PW at block 624. At block 626, the end router sends an acknowledge message back to the AS. After receipt of an acknowledgement message from the end router at block 612, the AS resumes routing traffic via the primary VLAN.

Figure 7:
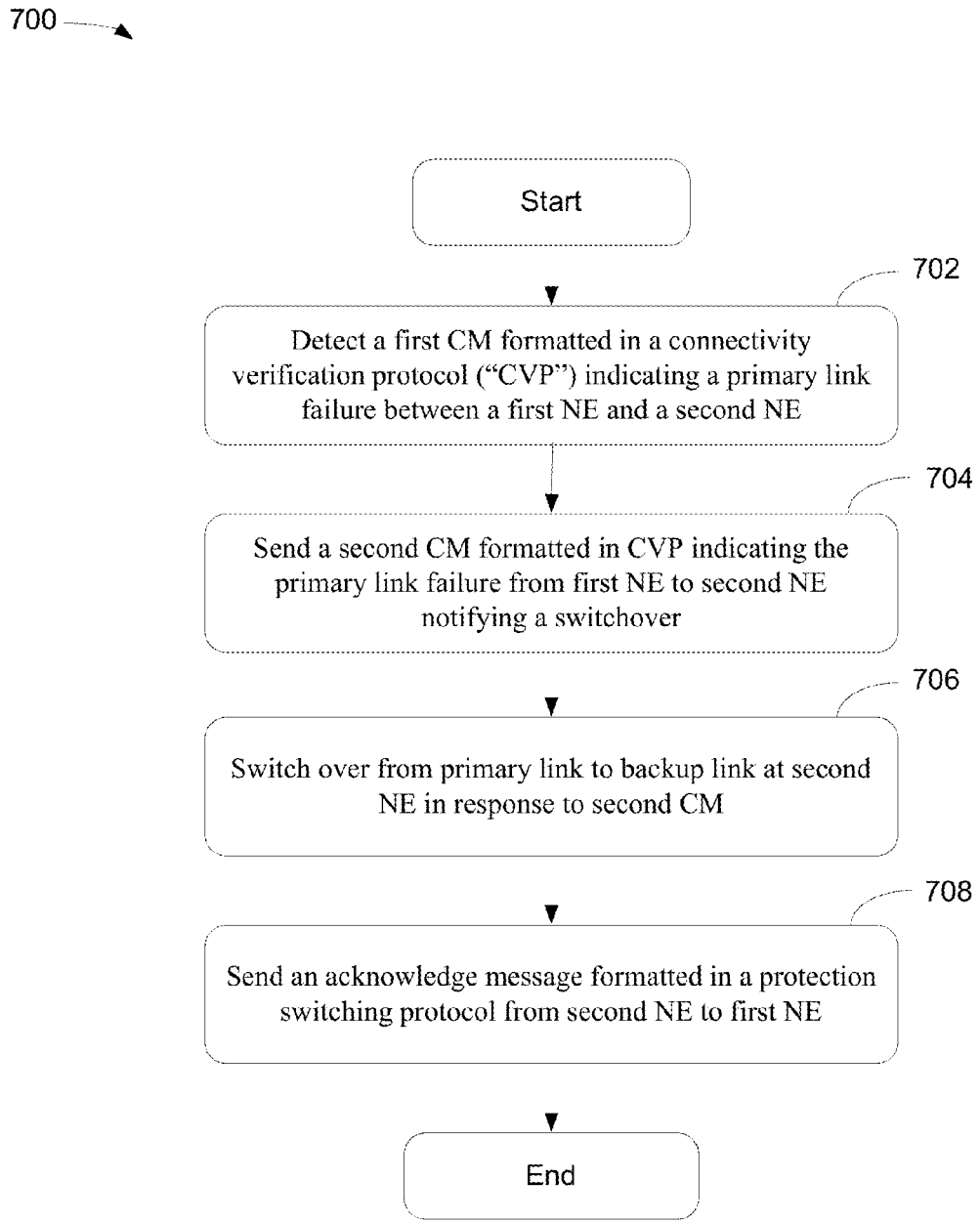
FIG. 7 is a block diagram illustrating an exemplary method of coordinated failing over to a backup router when the primary link fails in accordance with one embodiment of the present invention.

FIG. 7 is a block diagram 700 illustrating an exemplary method of coordinated failing over to a backup router when the primary link fails in accordance with one embodiment of the present invention. At block 702, a process capable of improving network performance is capable of monitoring and detecting a first checking message ("CM") formatted in a connectivity verification protocol ("CVP") indicating a primary link failure. The primary link is a connection between a first NE situated in a first network such as Ethernet and a second NE situated in a second network such as MPLS. A dual homing protection between the first NE, a primary router, a backup router, and the second NE utilizing Ethernet automatic protection switching mechanism is established. For example, the process detects a loss of CC managed by CFM over a primary VLAN or virtual connection. primary VPLS.

At block 704, a second CM formatted in the CVP such as 802.1ag CC message indicating the primary link failure is sent from the first NE to the second NE notifying a switchover from the primary link to a backup link. Upon sending a CC message with a RDI having a set value (RDI=1) to a primary router, the CC message is forwarded or passed from the primary router to the second NE via a PWE in MPLS network.

At clock 706, the process switches over from the primary link to the backup link at the second NE in response to the second CM utilizing a circuitry of protocol bundle. G.8031 message is subsequently sent from the first NE to the second NE indicating port closure via a backup VLAN and a backup PWE. A coordinated failover for both first and second NEs are performed in accordance with G.8031 under ITU standard.

At block 708, the process sends an acknowledge message formatted in a protection switching protocol operable in the first network from the second NE to the first NE. A G.8031 message from a destination node situated in a MPLS network is forwarded to the AS.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for improving network connection, comprising:
   detecting a first checking message ("CM") formatted in a connectivity verification protocol ("CVP") by a first network element ("NE") indicating a primary link failure between the first NE and a first router situated in a first network;
   sending a second CM formatted in the CVP indicating the primary link failure from the first NE to the first router via a primary virtual LAN ("VLAN");
   retransmitting the second CM from the first router to a second NE situated in a second network via a primary pseudo-wire ("PW") for notifying the second NE to switchover from a primary link to a backup link;
   switching over from the primary link to the backup link at the second NE in response to the second CM utilizing a circuitry of protocol bundle; and
   sending an acknowledge message formatted in a protection switching protocol operable in the first network from the second NE to the first NE.

2. The method of claim 1, further comprising establishing a dual homing protection between the first NE, a primary router, a backup router, and the second NE utilizing Ethernet automatic protection switching mechanism.

3. The method of claim 2, wherein establishing a dual homing protection between the first NE, a primary router, a backup router, and the second NE includes,
   employing G.8031 Ethernet Protection Switching under International Telecommunication Union ("ITU") standard for failover; and
   utilizing message of continuity check under IEEE 802.1ag standard for connectivity verification.

4. The method of claim 1, further comprising sending a G.8031 message from the first NE situated at Ethernet to the second NE situated at multiprotocol label switching ("MPLS") indicating port closure via a backup virtual local area network ("VLAN") and a backup pseudo-wire ("PW") facilitated by a backup router.

5. The method of claim 1, wherein detecting a first checking message ("CM") formatted in a CVP includes detecting a loss of continuity check ("CC") managed by connectivity fault management ("CFM") over a primary virtual LAN ("VLAN") between an access switch and a primary router.

6. The method of claim 5, wherein detecting a loss of CC managed by CFM over a primary VPLS between an access switch and a primary router includes monitoring the CC in accordance with IEEE 802.1ag standard for a point-to-point connectivity verification.

7. The method of claim 1, wherein detecting a first CM formatted in a CVP includes,
  establishing a primary virtual LAN ("VLAN") in Ethernet between an access switch and a primary router; and
  establishing an active circuit bundle member pseudo-wire ("PW") in a multiprotocol label switching ("MPLS") network between the primary router and the second NE.

8. The method of claim 7, wherein detecting a first CM formatted in a CVP includes,
  establishing a backup VLAN in the Ethernet between the access switch and a backup router; and
  establishing a non-active circuit bundle member PW in the MPLS network between the backup router and the second NE.

9. The method of claim 1, wherein sending a second CM formatted in the CVP indicating the primary link failure includes,
  sending a continuity check ("CC") message with a remote defect indication ("RDI") having a set value from the first NE to a primary router; and
  forwarding the CC message from the primary router to the second NE via a primary pseudo-wire ("PW") in multiprotocol label switching ("MPLS") network.

10. The method of claim 1, wherein switching over from the primary link to the backup link at the second NE in response to the second CM utilizing a circuitry of protocol bundle includes performing a coordinated failover for the first NE and the second NE in accordance with G.8031 under International Telecommunication Union ("ITU") standard.

11. The method of claim 1, wherein sending an acknowledge message formatted in a protection switching protocol operable in the first network from the second NE to the first NE includes forwarding a G.8031 message operable in Ethernet environment from a destination node situated in a multiprotocol label switching ("MPLS") network to an access switch situated in Ethernet for implementing a dual homing redundancy network configuration.

12. A method for improving network performance, comprising:
  detecting a continuity check ("CC") message indicating link recovery associated with a primary link between an access switch ("AS") and a primary router by the AS via a connectivity verification protocol;
  sending a message formatted in an Ethernet based protocol indicating a revert from a backup link to the primary link from the AS operable in Ethernet to a backup router via a primary virtual LAN ("VLAN") and retransmitting the message to a destination network element ("NE") operable in a multiprotocol label switching ("MPLS") network via a backup pseudo-wire ("PW");
  forwarding the message operable in Ethernet to a circuitry of protocol bundle of the destination NE notifying the destination NE to start a revert-timer via an active circuit bundle member pseudo-wire ("PW"); and
  reverting from the backup link to the primary link via Ethernet protection switching mechanism when the revert-timer expires.

13. The method of claim 12, further comprising establishing a dual homing protection between the AS, the primary router, a backup router, and the destination NE utilizing G.8031 Ethernet Protection Switching under International Telecommunication Union ("ITU") standard for failover and utilizing message of CC under IEEE 802.1ag standard for connectivity verification.

14. The method of claim 12, further comprising:
  forwarding a G.8031 message of port close from the AS to the destination NE to close its port; and
  sending an acknowledgement message from the destination NE to the AS once the port is closed in response to the G.8031 message of port close.

15. The method of claim 12, wherein sending a message formatted in an Ethernet based protocol indicating a revert from a backup link to the primary link includes,
  sending a CC message with a remote defect indication ("RDI") having a reset value from the AS to the primary router via the primary VLAN; and
  forwarding the CC message from the primary router to the destination NE via a primary PW in MPLS network.

16. The method of claim 12, wherein detecting a CC message indicating link recovery associated with a primary link between an access switch ("AS") and a primary router by the AS via a connectivity verification protocol includes,
  activating a system recovery process by the primary router to recover from an earlier system failure; and
  initiate the CC message indicating link recovery in accordance with IEEE 802.1ag for verifying point-to-point connectivity by the primary router.

17. The method of claim 12, wherein forwarding the message operable in Ethernet to a circuitry of protocol bundle of the destination NE notifying the destination NE to start a revert-timer includes sending an IEEE 802.1ag CC message to a port managed by G.8031 bundle at the destination NE in the MPLS network.

18. A network configuration comprising:
  a network element ("NE") coupled to a first end of a primary virtual LAN ("VLAN") link and configured to verify connectivity over a primary link via a connectivity verification protocol;
  a primary router coupled to a second end of the primary VLAN link and configured to communicate with the NE via a linear protection switching protocol, the primary router operable to receive a checking message ("CM") from the NE via the primary VLAN link;
  a backup router coupled to the NE via a backup link and operable to provide a dual homed network redundancy between the NE and the primary router via the linear protection switching protocol; and
  a destination NE, coupled to the NE, attached in a multiprotocol label switching ("MPLS") network and configured to have a primary port and a backup port configured to be operable with G.8031 bundle, the destination NE operable to receive the CM from the primary router via a primary pseudo-wire ("PW").

19. The network configuration of claim 18,
  wherein the connectivity verification protocol includes continuity check messages under IEEE 802.1ag standard; and
  wherein the backup link is G.8031 protected path managed in accordance with International Telecommunication Union ("ITU") standard.

20. The network configuration of claim 19,
  wherein the primary port of the destination NE is coupled to an active circuit bundle member pseudo-wire ("PW"); and
  wherein the backup port of the destination NE is coupled to a non-active circuit bundle member PW.

* * * * *

UNITED STATES PATENT AND TRADEMARK OFFICE
CERTIFICATE OF CORRECTION

| | | |
|---|---|---|
| PATENT NO. | : 8,879,383 B1 | Page 1 of 1 |
| APPLICATION NO. | : 13/245594 | |
| DATED | : November 4, 2014 | |
| INVENTOR(S) | : Sasha Cirkovic et al. | |

It is certified that error appears in the above-identified patent and that said Letters Patent is hereby corrected as shown below:

On the Title Page, Item (54) and in the Specification, Column 1, lines 1-3, in the title of invention please replace "METHODS AND APPARATUS FOR IMPROVING RELIABILITY OF POINT-OF-POINT NETWORK CONNECTION" with "METHODS AND APPARATUS FOR IMPROVING RELIABILITY OF POINT-TO-POINT NETWORK CONNECTION"

Signed and Sealed this
Tenth Day of March, 2015

Michelle K. Lee
*Deputy Director of the United States Patent and Trademark Office*